(12) United States Patent
Drescher et al.

(10) Patent No.: US 7,619,019 B2
(45) Date of Patent: Nov. 17, 2009

(54) LOW BAKE MELAMINE CURED COATING COMPOSITIONS

(75) Inventors: James C. Drescher, Portage, IN (US); Michael L. Jackson, LaGrange, IL (US); Lisa M. Muller, Palos Heights, IL (US); Frank A. Stubbs, Schererville, IN (US); Robert D. Tokash, Portage, IN (US)

(73) Assignee: Nippon Paint (USA), Inc., Teaneck, NJ (US)

( * ) Notice: Subject to any disclaimer, the term of this patent is extended or adjusted under 35 U.S.C. 154(b) by 555 days.

(21) Appl. No.: 11/375,450

(22) Filed: Mar. 14, 2006

(65) Prior Publication Data

US 2006/0223953 A1    Oct. 5, 2006

Related U.S. Application Data

(60) Provisional application No. 60/666,526, filed on Mar. 30, 2005.

(51) Int. Cl.
*C08K 5/42* (2006.01)

(52) U.S. Cl. .................. 524/157; 524/502; 524/507; 524/558; 525/375

(58) Field of Classification Search ............... 524/502
See application file for complete search history.

(56) References Cited

U.S. PATENT DOCUMENTS

| | | | |
|---|---|---|---|
| 4,374,164 A | 2/1983 | Blank | |
| 4,404,248 A | 9/1983 | Spinelli et al. | |
| 4,429,066 A * | 1/1984 | Gilmer | 524/158 |
| 4,451,597 A | 5/1984 | Victorius | |
| 4,546,046 A | 10/1985 | Etzell et al. | |
| 4,554,319 A | 11/1985 | Heaps et al. | |
| 4,634,738 A | 1/1987 | Santer | |
| 4,716,200 A | 12/1987 | Berghoff | |
| 4,812,336 A * | 3/1989 | Okamoto et al. | 427/257 |
| 5,187,199 A | 2/1993 | Sudo | |
| 5,565,531 A | 10/1996 | Blank | |
| 5,883,170 A | 3/1999 | Tanaka et al. | |
| 6,242,101 B1 | 6/2001 | Schwalm et al. | |
| 6,486,239 B2 | 11/2002 | Lee et al. | |
| 2001/0036985 A1 * | 11/2001 | Lee et al. | 524/261 |
| 2003/0060560 A1 * | 3/2003 | Baugh et al. | 524/558 |

FOREIGN PATENT DOCUMENTS

EP    0 306 472 A2    3/1989

OTHER PUBLICATIONS

Ramachandran et al "13C-NMR Studies of Commercial and Partially Self-Condensed Hexakis (methoxymethyl)melamine(HMMM)Resins",Journal of Applied Polymer Science, vol. 62, 1237-1251 (1996).

* cited by examiner

*Primary Examiner*—David Wu
*Assistant Examiner*—Vu Nguyen
(74) *Attorney, Agent, or Firm*—Barnes & Thornburg LLP

(57) ABSTRACT

The present invention provides reactive aqueous or solvent borne compositions comprising one or more low-temperature curing alkylether functional aminoplast resins having an average degree of polymerization of from 1.0 to 2.0, preferably alkylether group containing melamines, one or more hydroxyl group containing resins or polymers, such as acrylics and polyesters, one or more unblocked acid catalysts each having a pKa of 0.25 to 1.0, such as organic sulfonic acids, and one or more volatile amines, e.g. N-dipropylamine, that have a relative evaporation rate (RER) of 50-500, wherein, RER equals (p)(M)/11.6, with p being the vapor pressure of the amine in mm Hg and M being the molecular weight of the amine. The compositions cure at from 60° C. to 135° C., e.g. below 105° C., to form durable coatings suitable for plastic substrates, such as automotive plastics. The present invention also provides methods of forming the compositions comprising mixing the said aminoplast resins, hydroxyl group containing resins or polymers, unblocked acids and volatile amines to form a mixture, wherein the acids and the amines are added separately into the mixture.

10 Claims, No Drawings

LOW BAKE MELAMINE CURED COATING COMPOSITIONS

This application claims the benefit of U.S. Provisional Application No. 60/666,526 filed on Mar. 30, 2005

FIELD OF THE INVENTION

The present invention relates to low bake, reactive one-component and two-component coating compositions for coating plastic substrates. More particularly, it relates to one-component, shelf-stable alkylether functional aminoplast resin cured coating compositions which can cure at temperatures ranging from 60° C. to 105° C. to form automotive basecoat, colorcoat or monocoat, topcoat and clearcoat finishes, as well as to the methods of making the compositions.

BACKGROUND OF THE INVENTION

Coatings for lower melting point substrates, such as ABS and other plastics, have thus far comprised either non-reactive one-component coatings, one-component reactive blocked isocyanate systems, or two component, isocyanate-containing coatings. Non-reactive one-component coatings such as lacquers tend to perform poorly in physical testing. One-component reactive blocked-isocyanates have proven expensive to use, and usually act as lacquers, posing problems with compatibility and storage stability. Two-component, isocyanate containing coatings perform well in physical testing; however, such compositions are more expensive, are difficult to process due to their high or rapidly escalating viscosity in use, and are a proven health hazard. For example, two component acrylic/isocyanate coatings have not been accepted widely by the coating industry because of the toxicity of the isocyanates and the short pot life of these coatings.

For coating plastics and other heat sensitive substrates, a low temperature cure coating is desirable. However, low temperature cure gives coatings that are soft, have poor water and chemical resistance and poor durability.

A more durable acrylic and melamine containing coating that cures at a low temperature, for example, below 105° C., was proposed in U.S. Pat. No. 4,554,319A1, to Heaps et al. The Heaps et al. reference discloses low temperature curable surface coating compositions comprising a mixture of a solution of a hydroxy-functional styrene-allyl alcohol copolymer and an aminoplast, preferably a mixed methoxymethyl/butoxymethyl melamine, with a hydroxyl containing resin, such as an acrylic polymer, alkyd or polyester. The Heaps et al. reference touts the durability of the coatings it provides; however, the reference fails to provide a storage-stable one component coating. Further, the coatings provided by the Heaps et al. reference give poor gloss retention when cured at low temperatures of 77° C. and 104° C., and therefore give inferior resistance to acid, which would include acid rain.

In accordance with the present invention, the present inventors have sought to provide a shelf-stable coating, non-isocyanate containing composition, which can be cured at a low temperature for use on heat sensitive substrates, and, further, which does not suffer from the above-mentioned drawbacks.

SUMMARY OF THE INVENTION

The present invention provides aqueous and solvent borne compositions comprising one or more low-temperature curing alkylether functional aminoplast resins, such as alkyletherified melamines like hexamethoxymethyl melamine (HMMM) or mixtures of HMMM with hexamethoxy(methyl butyl) melamine, one or more hydroxyl group containing resins or polymers, such as acrylic polymers, polyesters and blends thereof, one or more unblocked acid catalysts, each having a pKa of 0.25 to 1.0, preferably sulfonic acids, such as dodecylbenzene sulfonic acid (ddbsa), one or more volatile amines having a relative evaporation rate (RER) of 50-500, wherein RER is equal to (p)(M)/11.6, with p being the vapor pressure of the amine in mm Hg, measured at 20° C., and M being the molecular weight of the amine. For reference, the RER of butyl acetate is 100. Preferably, the one or more amine comprises one or more secondary amines, such as di-n-propylamine.

Alkylether functional aminoplast resins which are suitable for use in the coating compositions include alkoxymethyl or alkylether functional polyamino nuclei, wherein the said nuclei are chosen from melamine, acetoguanamine, adipoguanamine, and benzoguanamine. The one or more aminoplast resins may be chosen from monomeric alkylether functional polyamino nuclei and alkylether functional melamine which has an average degree of polymerization of from 1.0 to 2.0. Preferably, the one or more alkylether functional aminoplast resins comprise alkylether group containing melamines having from 4 to 6 alkylether groups per melamine ring. Preferred alkylether groups comprise mixtures of methoxymethyl and butoxymethyl groups, such that the weight ratio of methoxymethyl to butoxymethyl groups ranges from 80:20 to 95:5. More preferably, alkylether functional aminoplast resins comprise methoxymethyl and butoxymethyl group containing melamines have an average degree of polymerization from 1.0 to 1.5

Suitable hydroxyl group containing resins or polymers may comprise acrylic resins and polyesters with sufficient hydroxyl content for reactivity at the desired curing temperature of from 60° C. to 135° C., and, preferably, of from 60° C. to 105° C. Examples of suitable hydroxyl group containing resins or polymers may comprise acrylic polymers having an hydroxyl number of from 20 to 140 mg KOH/g, polyesters having an hydroxyl number of from 100 to 300 mg KOH/g, and mixtures thereof. In one embodiment of the present invention, the one or more hydroxyl group containing resins or polymers comprises polyester blended with acrylic resin in a weight ratio of from 0.15:1 to 0.25:1.

The compositions of the present invention can be used in two-component, non-isocyanate containing compositions to provide a low-bake temperature coating for use on plastic or heat sensitive substrates, such as acrylonitrile-butadiene-co-styrene polymers (ABS) and thermoplastic polyolefins (TPO), as well as on substrates that can accommodate high bake coatings, for example nylon alloys.

In another embodiment, the instant invention provides methods of making the compositions of the present invention which comprises mixing the one or more alkylether functional aminoplast resins, the one or more hydroxyl group containing resins or polymers, the one or more unblocked acids and the one or more volatile amines to form a mixture, wherein the acid and the amine are added into the mixture separately from one another.

The composition of the present invention may be applied to one or more heat sensitive substrates or plastic substrates, such as ABS or TPO, to form a film which is cured to form a coating.

DETAILED DESCRIPTION OF THE INVENTION

The instant invention provides one-component, reactive alkylether functional aminoplast resin cured coating compositions for heat sensitive substrates, such as wood, paper, or plastic, particularly automotive plastics, e.g. ABS or TPO. For example, to accommodate most automotive plastic substrates, the target coating or film bake temperature ranges from 80° C. to 93° C. Accordingly, the one or more alkylether functional aminoplast resins may be chosen from monomeric alkylether functional polyamino nuclei and alkylether functional melamines having an average degree of polymerization of from 1.0 to 2.0, as well as mixtures thereof. Through use of monomeric alkylether functional polyamino nuclei and/or alkylether functional melamine having an average degree of polymerization of from 1.0 to 2.0, the reactive compositions of the present invention provide lowered viscosity and enable cure at processing temperatures of from 60° C. to 105° C. The compositions are isocyanate free, reducing their toxicity and easing processing. Additionally, the non-isocyanate containing composition can provide an energy saving low-bake temperature coating for use on substrates that can accommodate high bake coatings, for example nylon alloys.

All ranges cited herein are inclusive and combinable. For example, if an ingredient may be present in amounts of 4 wt. % or more, or 10 wt. % or more, and may be present in amounts up to 25 wt. %, then that ingredient may be present in amounts of any of 4 to 10 wt. %, 4 to 25 wt. % or 10 to 25 wt. %.

Unless otherwise indicated, all temperature and pressure units are standard temperature and pressure (STP).

All phrases comprising parentheses denote either or both of the included parenthetical matter and its absence. For example, the phrase "(co)polymer" includes, in the alternative, polymer, copolymer and mixtures thereof.

As used herein, the term "acrylic" includes both acrylic and methacrylic, and combinations and mixtures thereof, the term "acrylate" includes both acrylate and methacrylate, and combinations and mixtures thereof, and the term "acrylamide" includes both acrylamide and methacrylamide, and combinations and mixtures thereof.

As used herein, the phrase "acid number" refers to the number of mg KOH required to neutralize the alkali-reactive groups in 1 g of polymer and has the units (mg KOH/g polymer). The acid number is determined according to ASTM standard test method D 1639-90.

As used herein, the term "aminoplast" refers to any of the large number of alkoxylated amino resins which are employed in the art of surface coatings. Such amino resins are referred to as being soluble in common organic solvents.

As used herein, the term "average degree of polymerization" means the number average molecular weight (Mn) divided by the weight per triazine ring, wherein Mn is measured by size-exclusion chromatography using a polystyrene blank and, further wherein, the weight per triazine ring means, unless otherwise indicated, the atomic molecular weight of one unit of the polymer, e.g. the hexaalkyoxymethyl melamine ring formed by reacting melamine with formaldehyde and then with methanol and/or butanol. Alternatively, the weight per triazine ring can be determined from NMR for an exact number. Monomeric aminoplasts have a degree of polymerization of 1.0. In any mixture of aminoplast resins, the term "average degree of polymerization" refers to the weighted average of the average degree of polymerization for all aminoplast resins present in the mixture. Thus, for example, if 10 grams of a monomeric melamine is mixed with 10 grams of a melamine resin having an average degree of polymerization of 1.5, the average degree of polymerization of the aminoplast mixture is 1.25.

As used herein, the term "Basecoat" means the components of a paint or a clearcoat, and may comprise one or more dyes, colorants or pigments and any other custom additives. A waterborne basecoat formulation as employed in the present invention may comprise one or more than one aqueous polymer or resin dispersion. A basecoat may be applied to a primer or adhesion promoter layer on a substrate.

As used herein, the term "Clearcoat" means a coating composition which, when dry, forms an optically clear or transparent coating on a substrate. A clearcoat may be coated on a topcoat, basecoat or a colorcoat.

As used herein, the term "topcoat" and "colorcoat" mean the components of a paint or a clearcoat comprising one or more dyes, colorants or pigments and any other custom additives to match a desired color or finish.

As used herein, the "glass transition temperature" or Tg of any polymer may be calculated as described by Fox in $Bull.$ $Amer. Physics. Soc.,$ 1, 3, page 123 (1956). The Tg can also be measured experimentally using differential scanning calorimetry (DSC at a rate of heating 20° C. per minute, Tg taken at the midpoint of the inflection). Unless otherwise indicated, the stated Tg as used herein refers to the calculated Tg.

As used herein, the softening point of any polymer or resin may be experimentally measured using differential scanning calorimetry (DSC), measured as the middle of the peak corresponding to softening in the DSC curve.

As used herein, the phrase "hydroxyl number" refers to the number of milligrams (mg) of KOH equivalent to the hydroxyl groups present in each gram (g) of polymer and has the units (mg KOH/g polymer).

As used herein, the term "Mw" refers to weight-average molecular weight, as determined by the gel permeation chromatography (GPC) of an analyte sample, followed by analyzing the results obtained thereby using Waters-Millenium, Version 3.2 software to obtain the desired value.

As used herein, the term "Mn" refers to number-average molecular weight, as determined by the gel permeation chromatography (GPC) of an analyte sample, followed by analyzing the results obtained thereby using Waters-Millenium, Version 3.2 software to obtain the desired value.

"Paint" is a term commonly known in the art to mean a coating composition suitable for purpose which, when dry, forms an opaque coating on a substrate. A paint comprises a basecoat and one or more other components including at least one of: dyes and pigments.

As used herein, unless otherwise indicated, the phrase "per hundred parts resin" or "phr" means the amount, by weight, of an ingredient per hundred parts, by weight, of the total amount of resin, reactant monomer, and polymer contained in a composition, including cross-linking resins of any kinds. The phrase "phr" may be used interchangeably with the phrase "based on total resin solids."

As used herein, the phrase "TPO" refers to thermoplastic polyolefin, a substrate comprising at least about 50 wt. % of a resin which may be a propylene homopolymer or a copolymer in which at least 60 wt. % of the monomer content is propylene.

As used herein, the phrase "plastics" refers to TPO, acrylonitrile-butadiene-co-styrene polymer (ABS), thermoplastic polyurethane (TPU), polyethylene terephthalate (PET), polyethylene (PE), polypropylene (PP), PE/EPDM (ethylene-propylene-diene rubber), PP/EPDM, nylon, rapid or reactive injection molded (RIM) urethanes, sheet molded composites (SMC), polycarbonate (PC), polyacetal, or mixtures thereof, such as ABS/PC, and combinations thereof.

As used herein, the term "polymer" includes polymers, copolymers and terpolymers, block copolymers and terpolymers, and mixtures thereof.

As used herein, the term "resin" includes any reactive polymers, copolymers and terpolymers, block copolymers and terpolymers, monomers, oligomers and mixtures thereof.

As used herein, the phrase "total solids" refers to the percentage of organic and inorganic solids, by weight, remaining after removal of water and volatile components, expressed as a portion of the total weight of a composition.

As used herein, the phrase "wt. %" stands for weight percent.

The following describes in detail the one or more aminoplasts, hydroxyl group containing resins or polymers, acids, and volatile amines used in the compositions of the present invention.

Suitable alkylether functional aminoplast resins for the purpose of the present invention include the alkoxymethyl derivatives of polyamino nuclei such as melamine, acetoguanamine, adipoguanamine, and benzoguanamine. More particularly, suitable aminoplasts may be chosen from alkylether functional polyamino nuclei such as, acetoguanamine, adipoguanamine, and benzoguanamine which are monomeric, as well as monomers and oligomers of melamine.

The aminoplasts are completely methylolated or within one methylol group of completely methylolated polyamino triazines that are fully etherified or within one ether group of fully etherified with alcohol. They can be prepared by reaction of the polyamino triazine with formaldehyde to methylolate the amino groups and the methylolated groups are then etherified by reaction with alcohol. The mixed ethers of this invention can be prepared by transetherifying a polyalkoxy methyl melamine with a butyl alcohol. The etherified methylolated amino triazines are liquid and are essentially monomeric. Melamines may be monomeric or at most oligomeric with an average degree of polymerization of no more than 2, the amino triazine rings being joined by methylene or methylene ether bridges. The etherified amino triazines within the scope of the invention possess a ratio of amino triazine to combined formaldehyde in the range of about 1:(2n−1) to about 1:2n where n is the number of amino groups per triazine ring and possesses a ratio of amino triazine to alkyl ether groups in the range of about 1:2n−2 to about 1:2n. The preferred amino triazine is melamine since it has three amino groups per ring and is potentially hexafunctional. Accordingly, the most preferred amino triazine compounds are alkoxy methylmelamines in which the combined ratio, as indicated by the overall molar ratios as determined by bulk analysis of melamine to formaldehyde, is in the range of about 1:5 to 1:6 and the combined ratio of melamine to alkoxy groups is in the range of 1:4 to 1:6, and the degree of polymerization ranges from 1.0 to 2.0, preferably from 1.0 to 1.5. The alcohols suitable for the etherification of the methylol melamine are methanol, butanol, and mixtures thereof.

The alkylether functional aminoplast resins preferably comprise mixed ether functions, such as a methoxymethyl/butoxymethyl mixture. The range of the ratio of methoxymethyl/butoxymethyl can vary widely. Further, a single alkyl alcohol can also be used for etherification to give, for example, monomeric hexamethoxymethyl melamine (HMMM). While HMMM or a melamine substituted with solely methoxymethyl groups may be used, the inventors have found that methoxybutyl groups on melamine resins give surprisingly rapid cure. Accordingly, useful melamine resins may comprise methoxymethyl and methoxybutyl groups in a weight ratio ranging from 0-100:100-0, or from and, preferably, in a weight ratio ranging from 80:20 to 100:0, or from 90:10 to 100:0, or from 80:20 to 95:5, or from 92.5:7.5 to 100:0, or from 95:5 to 100:0. Such melamine resins can comprise a mixed alkylether melamine, e.g. a hexamethoxy (methyl butyl) melamine, or a mixture of HMMM and hexamethoxybutyl melamine. One suitable melamine resin for use in the composition may comprise RESIMENE™ CE-7103 from UCB Surface Specialties, St. Louis, Mo., which has an average degree of polymerization of 1.15 and contains 10% of methoxybutyl groups, i.e. a weight ratio of methoxymethyl to methoxybutyl groups of 90:10. Another suitable melamine resin for use in the composition may comprise RESIMENE™ 747 from UCB Surface Specialties, St. Louis, Mo., a partly self-condensed hexamethoxymethyl melamine (HMMM) which has an average degree of polymerization of 1.4.

Suitable amounts of the one or more alkylether functional aminoplast resins is selected to provide a sufficient concentration of alkoxymethyl groups to provide an adequate degree of crosslinking by reaction with the hydroxyl group containing resins or polymers of the present invention. Advantageously, the alkylether functional aminoplast resins may be used in the amount of 1 wt. % or more, based on the total weight of resin solids, i.e. 1 phr, or 2 phr or more, or 3 phr or more, and up to 60 phr, or up to 50 phr, or up to 45 phr.

The one or more hydroxyl group containing resins or polymers can be chosen from among of a number of acrylic polymers and polyester resins, including commercially available resins. Suitable hydroxyl group containing resins or polymers may comprise acrylic resins and polyesters with sufficient hydroxyl content for reactivity at the desired curing temperature of from 60° C. to 135° C., and, preferably, of from 60° C. to 105° C.

The one or more acrylic polymers which can be used to prepare the compositions of the present invention may be chosen from any of a number of commercially available hydroxyl-group containing acrylic polymers. The one or more hydroxyl group containing acrylic polymers of the present invention desirably have a Tg of −30° C. or more, or −20° C. or more, or −15° C. or more, and up to 120° C., or up to 100° C., or up to 90° C. Further, the one or more hydroxyl group containing acrylic polymers suitably have an hydroxyl number of 20 or more, or 25 or more, or 30 or more, and up to 140, or up to 125, or up to 100. Hydroxyl numbers should be low enough so as not to adversely affect storage stability, but high enough so as not to adversely affect cure. Hydroxyl numbers as high as 200 would be suitable in a two-component system where storage stability is not as major a concern. The number average molecular weight (Mn) of suitable acrylic polymers in the present invention, as measured by gel permeation chromatography (GPC), may range from 2000 or more, or 2500 or more, or 3000 or more, and up to 6000, or up to 5000, or up to 4500. Preferably, the one or more hydroxyl group containing acrylic polymers have a primary hydroxyl functionality, defined as number average molecular weight/primary hydroxyl equivalent weight, of from 2 to 10.

The one or more acrylic polymers may comprise the addition (co)polymerization products of one or more 1 to 18 carbon alkyl and one or more hydroxyalkyl ester of (meth) acrylic acid. Examples of alkyl esters of (meth)acrylic acid which may be used in the compositions of the present invention include methyl acrylate, ethyl acrylate, propyl acrylate, isopropyl acrylate, butyl acrylate, hexyl acrylate, octyl acrylate, 2-ethyl hexyl acrylate, cyclohexyl acrylate, decyl acrylate, stearyl acrylate, methyl methacrylate, methyl α-ethyl acrylate, ethyl methacrylate, butyl methacrylate, butyl α-ethyl acrylate, ethylhexyl methacrylate and dodecyl methacrylate. Examples of hydroxy esters of (meth)acrylic acid which may be used in the present invention include hydroxyethyl acrylate, hydroxybuty acrylate, hydroxyethyl methacrylate, hydroxybutyl methacrylate and hydroxy propyl acrylate. The polymers may also comprise the polymerization reaction product of additional comonomers. Examples of the comonomers which may be used in the compositions of the present invention are phenyl allyl alcohol, glycidyl methacrylate, styrene, α-methyl styrene, (meth)acrylic acid, acrylonitrile, maleic anhydride, allyl acrylate, vinyl acrylate, allyl acetate, and vinyl acetate.

In a preferred embodiment, the one or more acrylic polymers of the present invention comprise the (co)polymerization reaction product of one or more hydroxyalkyl (meth) acrylate with one or more alkyl (meth)acrylates and an aromatic monomer chosen from one or more of styrene, a styrol or an arylene alcohol, wherein the amount of the aromatic monomer ranges from 5 to 25 wt. % of the total monomer content, to give compositions exhibiting good adhesion to ABS substrates.

For use in aqueous applications, the compositions may comprise one or more hydroxyl group containing acrylic polymers having an acid value (mg KOH/g sample polymer) of from 15 to 75 to insure that the acrylic polymers are water dispersable but not unacceptably sensitive to water. Such acrylic polymers are the copolymerizates of monomers comprising (meth)acrylic acid and may be stabilized in aqueous dispersion by neutralization with ammonia or with a volatile amine, such as dimethylethanolamine prior to their admixture with the one or more alkylether functional aminoplast resins, acids and volatile amines of the present invention.

The one or more hydroxyl group containing polyesters of the present invention have an hydroxyl number of 100 or more, or 125 or more, or 150 or more, and as high as 300, or up to 275, or up to 250. Hydroxyl numbers should be low enough so as not to adversely affect storage stability, but high enough so as not to adversely affect cure. Hydroxyl numbers as high as 400 would be suitable in a two-component system where storage stability is not as major a concern. Suitable hydroxyl group containing polyesters are preferably tri-hydroxyl functional.

The one or more hydroxyl group containing polyesters which can be used to prepare the composition of this invention may be saturated, unsaturated or oil-modified such as those polyesters well known in the surface coating art. Polyesters are prepared by reacting an excess of one or more polyhydric alcohol (polyol) with one or more polybasic acid. Preferably, the hydroxyl group containing polyesters are branched, tri-hydroxyl group functional polyesters which are the reaction product of polyols comprising triols.

Suitable polyols include ethylene glycol, propylene glycol, butylene glycol, diethylene glycol, dipropylene, glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerylthritol, sorbitol, mannitol, methyl glycoside, 2,2-bis(hydroxyethoxyphenyl)propane, 2,2-bis (beta-hydroxypropoxyphenyl)propane and the like. Monofunctional alcohols may also be employed to supplement the other polyols and to control the molecular weight. Useful alcohols include those having a hydrocarbon chain comprising from about 3 to about 18 carbon atoms. Preferred polyols include, as diols, neopentyl glycol, and, as triols, trimethylolethane, trimethylolpropane, glycerol, and 1,2,6-hexanetriol.

The acid component of such polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example, phthalic acid, tetrahydroxyphthalic acid, hexahydroxyphthalic acid, endomethylenetetrahydroxyphthalic anhydride, tetrachlorophthalic anhydride, hexachloroendomethylene tetrahydrophthalic acid, and the like. The term "acid" as used herein includes the corresponding anhydrides, where such anhydrides exist.

Suitable polybasic acids may optionally include one or more fatty acids. These include saturated fatty acids such as decanoic, dodecanoic, tetradecanoic, hexadecanoic, octadecanoic, docosanoic, and the like. And in addition, unsaturated fatty acids may be used such as 9-octadecenoic, 9,12-octadecadieoic, 9,12,15-octadecatrienoic, 9,11,13-octadecatrienoic, 4-keto-9,11,13-octadecaterienoic, 12-hydroxy9-octadecanoic, 13-docosanoic, and the like.

Preferably, the one or more hydroxyl group containing polyester comprises a tri-functional primary hydroxyl functional, branched polyester which comprises the reaction product of one or more diols, one or more dicarboxylic acids and one or more triols.

Regarding proportions of the acrylic and polyester resins or polymers, each of the one or more acrylic polymers and the one or more polyester resins may be used in the alternative, comprising 100 wt. % of the hydroxyl group containing resins or polymers in a given composition. When acrylic polymers and polyesters are blended in the amount of any 100 weight parts, the one or more acrylic polymers may be present in the amount of 5 wt. % or more, or 10 wt. % or more, and up to 95 wt. % or less, or 90 wt. % or less, where the remainder of the blend comprises the one or more polyester. In a preferred embodiment of the present invention, the composition comprises a blend of one or more hydroxyl group containing acrylic polymer with one or more hydroxyl group containing polyester in a weight ratio of polyester to acrylic of from 0.15:1 to 0.25:1.

Hydroxyl functional acrylic polymers of the present invention may be polymerized in a conventional batch reactor in bulk or in a solvent bath using radical polymerization catalysts, such as peroxides, perborates, persulfates, perbenzoates, and bis-nitriles. In the alternative, acrylic resins may be synthesized as aqueous dispersions in the presence of the radical polymerization catalysts and surface active agents, such as polyoxyethylene nonyl phenyl ether, followed by letdown and drying, and then dissolution into a desired solvent medium. Monomers may be added to the aqueous dispersion polymerization medium via gradual addition, as one shot, or they may be included as a part of the pre-reaction mixture. Preferably, the acrylic polymers are formed by solution polymerization, under pressure and in a nitrogen atmosphere. Suitable polymerization pressures may range up to 21 bar, or up to 10.5 bar, or up to 7 bar, and may be as low as 1 bar or more. Suitable amounts of solvent and/or water in the acrylic polymerization mixture may range 15% or higher, based on the total weight of the polymerization mixture, or 20% or higher, and can be as much as 90% or less or up to 50% or less. Suitable amounts of one or more radical polymerization catalysts in the acrylic polymerization mixture may range 0.1% or higher, based on the total weight of the polymerization mixture, or 0.5% or higher, and can be as much as 12% or less or up to 10%.

Hydroxyl functional polyesters of the present invention may be formed by condensation in bulk (neat) or in a solvent medium, preferably in bulk. The reactants can be condensed by heating, by heating in the presence of one or more phosphate ester catalyst, such as phenyl acid phosphate, or one or more trialkyltin catalyst, such as tributyl tin oxide, or, preferably, without heating in the presence of one or more catalyst. Suitable amounts of solvent and/or water in the polyester condensation mixture may range 0 wt. % or higher, based on the total weight of polyester and solvent and/or water, or 10 wt. % or higher, and can be as much as 40 wt. % or less or up to 20 wt. % or less. Suitable amounts of one or condensation catalysts in the polyester condensation mixture may range 0% or higher, based on the total weight of the reaction medium, or 0.1 wt. % or higher, and can be as much as 3 wt. % or less or up to 1.0 wt. %.

The level of initiator or condensation catalyst used will not change the polymer or resin, it will just effect the manufacturing parameters necessary to make the polymer, i.e. more initiator will allow the reaction to take place at lower temperatures, but less initiator will require higher temperature and/or pressure.

In order to achieve low temperature curing using the compositions of this invention, an acid catalyst having a pKa range of 0.25 or higher, or 0.5 or higher and up to 1.0 may be used. Acid pKa's must be high enough to insure shelf stability and low enough to insure adequate reactivity to cure at from 60° C. to 105° C. in a time period of from 10 minutes to one hour. Blocked acids do not unblock at the desired low bake temp and are not used. Included are catalysts such as para-toluenesulfonic acid, methanesulfonic acid, hydrochloric acid, dodecylbenzene sulfonic acid, dinonylnaphthalene disulfonic acid and other organic and mineral acids having at least one active hydrogen group per molecule. Because most of the above acid catalysts are crystalline at room temperature, solutions in methanol or another solvent having a boiling point of less than about 63° C. may be used to facilitate handling.

Preferably, the one or more acid catalyst comprises organic sulfonic acids. More preferably, the one or more acid comprises p-toluene sulfonic acid (p-TSA), dodecylbenzene sulfonic acid (DDBSA), dinonylnaphthalene disulfonic acid, and mixtures thereof. Acid catalyst concentration can range from 0.5 wt. % or more, based on the total weight of resin solids, or 1.0 wt. % or more, or 1.5 wt. % or more, and up to 10 wt. % or less, or up to 6% wt. % or less, or up to 5 wt. % or less. When the coating is to be used as a topcoat more complete cure is desired and therefore from 1.5 to 10 wt. % of the one or more acid catalyst is used, based on the total weight of resin solids.

The compositions of the present invention comprise one or more volatile amine in combination with the one or more unblocked acid catalysts to confer shelf stability without slowing down cure rate. Suitably, the one or more volatile amines in the compositions of the present invention may comprise any one or more amine having a relative evaporation rate (RER) of 50 or higher, or, for example, 100 or higher, and up to 500, preferably up to 300, wherein RER is equal to (p)(M)/11.6, with p being the vapor pressure of the amine in mm Hg and M being the molecular weight of the amine. For reference, the RER of butyl acetate is 100. Amines that are have too slow of an evaporation rate are not suitable, as the cure is slowed down. Further, amines that evaporate too quickly may neutralize or block the one or more acid catalysts.

The following data describes relative evaporation rates using the formula RER=(p)(M)/11.6, with p being the vapor pressure of the amine in mm Hg and M being the molecular weight of the amine, wherein the vapor pressure is measured at 20° C.

| Chemical | Vapor Pressure (mm Hg) at 20 C. | Molecular Weight | Relative Evap. Rate |
|---|---|---|---|
| Ethanolamine | 0.4 | 61.1 | 2 |
| AMP | 1 | 89.1 | 8 |
| n-butyl acetate | 10 | 116.2 | 100 |
| Dimethylethanolamine | 4.4 | 89 | 34 |
| Di-n-propylamine | 18 | 101.2 | 157 |
| Methylethanolamine | 0.75 | 75.1 | 5 |

Examples of suitable secondary amines include di-n-propylamine, di-secondary-butylamine, butylethylamine, diphenylamine, N-ethyl-1,2-diisobutylamine, dimethylpropylamine, N-methylhexylamine, pyridine, morpholine, and the various methylpyridines. Examples of suitable primary amines may include n-butylamine, n-pentylamine, n-hexylamine, iso-hexylamine and iso-octylamine. Preferably, the amines comprise the above-mentioned secondary amines. The one or more amines may be used in a total amount of 0.0025 wt. % or more, based on the total weight of resin solids, or 0.005 wt. % or more, or 0.01 wt. % or more, and up to 10 wt. %, or up to 6 wt. %, or up to 5 wt. %.

The coating composition of the invention may be colored with one or more pigments or colorants usually employed for coloring of such coating compositions, such as an organic pigments, metal oxides, micas, and metallic pigments. Examples of suitable pigments or colorants may comprise metal oxides, such as red iron oxide, rutile and anatase titania; carbon black, treated micas, such as iron oxide grey and synthetic iron oxide yellow; aluminum flake, such as aluminum flake or inhibited aluminum; and organic pigments, such as phthalocyanines, like copper phthalocyanine blue, perylene red and maroon, quinacridone magenta and dioxazine carbazole violet. Suitable amounts of the one or more pigments or colorants may range up to 60 wt. %, based on the total weight of solids, or up to 50 wt. %, or up to 40 wt. %, and may be as low as 0 wt. %.

The compositions of the invention may also have incorporated therein other additives such as one or more of each of durability additives, such as aminoether hindered amine light stabilizers and triazine ultraviolet light absorbers in the amount of from 0 to 10 wt. %, based on the total weight of solids, preferably up to 3 wt. %; wetting agents, conditioning agents, rheology control additives, such as cellulose acetate butyrate (CAB), high molecular weight poly(meth)acrylates, microgels for sag resistance, and organically modified layered clays, such as quaternary alkyl or aryl ammonium treated montmorillonite; flow additives in the amount of from 0 to 5 wt. %, based on the total weight of solids, ultraviolet stabilizers, antioxidants, dispersants, and such as silicones, especially in clearcoat formulations, for flow, leveling, slip and mar properties.

Regarding rheology control additives, the amount used depends on the coating and the desired effect. For example, a higher amount of such additives may be used in metallic pigment containing coatings to provide metal control. The amount of the one or more CAB, microgels, or mixtures thereof used may range up to 30 wt. %, based on the total weight of solids, or up to 15 wt. %, or up to 10 wt. %. The amount of the one or more organically modified layered clays used may range up to 3 wt. %, based on the total weight of solids, or up to 1.5 wt. %, or up to 1.0 wt. % and may be used in amounts as low as 0 wt. %, or as low as 0.1 wt. %.

The amount of the one or more silicones used may range up to 2 wt. %, based on the total weight of solids, or up to 1 wt. %, or up to 0.5 wt. %.

For use in primer, basecoat and monocoat applications for coating plastic, the compositions may also comprise one or more adhesion promoter chosen from chlorinated polyolefin (CPO), modified isotactic polypropylene (MPP), MPP copolymers, MPP adducts, MPP copolymer adducts, and mixtures thereof. In general, MPP (co)polymers have 1 or more or 2 or more and up to 10 carboxyl, anhydride, hydroxyl or epoxy functional groups, preferably present as terminal groups. MPP (co)polymers and their adducts are more water dispersible if they have more carboxyl, anhydride, or hydroxyl groups and, conversely, are more solvent soluble if they have fewer such groups. Accordingly, adhesion promoter containing compositions may comprise mixtures of CPO or MPP (co)polymers with hydroxyl functional acrylic or polyester resins. Further, weatherable primers may comprise weatherable CPO, MPP or MPP copolymer adducts with alkyds or urethanes and mixtures thereof in addition to the hydroxyl functional acrylic or polyester resins, or they may comprise CPO, MPP or MPP copolymer adducts with hydroxyl functional acrylics or polyesters. CPO or MPP (co)polymers, including that portion of MPP (co)polymers comprising MPP (co)polymer adducts, should be used in the amount of 5 wt % or more of total resin solids, or 8 wt % or more, or 10 wt % or more, and up to 40 wt %, preferably up to 25 wt %.

One or more solvents useful in solvent borne compositions according to the present invention may include aromatic solvents, such as toluene, xylene, naptha, and petroleum distillates; aliphatic solvents, such as heptane, octane and hexane; ester solvents, such as butyl acetate, isobutyl acetate, butyl propionate, ethyl acetate, isopropyl acetate, butyl acetate, amyl acetate, ethyl propionate and isobutylene isobutyrate; ketone solvents, such as acetone and methyl ethyl ketone; lower alkanols; glycol ethers, glycol ether esters, lactams, e.g. N-methyl pyrrolidone (NMP); and mixtures thereof.

To enhance sprayability and to lower viscosity, one or more fast evaporating solvents chosen from lower alkyl (C1 to C6) ketones, lower alkyl (C1 to C4) alkanols, xylene and toluene may be added in amounts of from 0.5% to 10 wt. %, based on the total weight of the composition. One or more slow evaporating solvents such as aromatic process oil, petroleum distillates, lactams, e.g. NMP, alkyl and alkylaryl esters, e.g. ethylhexyl acetate, and glycol ethers, such as butyl cellosolve, may be added in the amount of from 0.5 to 5 wt. %, based on the total weight of the composition. A blend of slow and fast evaporating solvents may be used to aid in film formation and to provide sag resistance.

The compositions of the present invention may be used to make clearcoats, basecoats, colorcoats, monocoats and primers, and in-mold coatings. Compositions of adequate viscosity for such applications, advantageously have total solids 10 wt. % or more, based on the total weight of the compositions, or 20 wt. % or more, or 30 wt % or more, and may have total solids in the amount of up to 90 wt. %, or up to 70 wt. % or up to 60 wt. %. Accordingly, the compositions may comprise water and/or one or more solvents in the amount of 10 wt. % or more, based on the total weight of the compositions, or 30 wt. % or more, or 40 wt % or more, and up to 90 wt. %, or up to 80 wt. % or up to 70 wt. %.

In another embodiment, the present invention comprises methods of making compositions which comprises mixing the one or more alkylether functional aminoplast resins, the one or more hydroxyl group containing resins or polymers, the one or more unblocked acids, and the one or more volatile amines, wherein the acid and the amine are added into the mixture separately from one another. This process maintains the catalyst in an unblocked state and may be used in both solvent borne applications and water borne applications where any acid functional polymers have been neutralized prior to their admixture into the composition.

The coating compositions of the present invention may be applied by applicator devices, such as those used in spraying, electrostatic bell, cascade coating, rotational fogging, dip coating or film casting devices and techniques. Such devices and techniques are well known in the art, for example, electrostatic or pneumatic spraying is employed. All devices and techniques may be automated robotically. In addition, when used in an in mold application, the coating compositions of the present invention may be pressure fed into a mold prior to curing, or may be coated on the mold, followed air drying 5-10 minutes prior to filling the mold and curing. All compositions may be applied at room temperature.

The compositions of the present invention may be coated on substrates including polyolefins, such as TPO, polyethylene (PE), polypropylene (PP), PE/EPDM, PP/EPDM; acrylonitrile/butadiene/styrene (ABS); polycarbonates (PC) polyacetals, polyamides, poly(meth)acrylates, polystyrenes, polyurethanes, or mixtures thereof, such as ABS/PC, and combinations thereof. Such substrates may be used as automotive plastics for interior and exterior use, e.g. bumpers, and may be used for other uses, including molded articles, toys, sporting goods, and cases or coverings for electronic devices and small appliances.

In the Examples that follow, an MEK double rub cure test demonstrates the durability and solvent resistance of coatings made with the compositions of the present invention and a storage stability test demonstrates the storage stability of such coatings.

The MEK double rub cure test comprises applying a layer of a basecoat composition and curing it to a dry film thickness of 0.7 to 1.0 mils on a 3"×6" thermoplastic urethane plastic panel, followed by applying methyl ethyl ketone to a paper towel and rubbing the paper towel back and forth across the coating panel thirty times. The ability to scratch the coating with a human thumbnail was assessed based on coating appearance, and the resulting integrity of the film was rated as very good, good or unacceptable.

The storage stability test for one-component coatings comprises measuring initial #4 Ford cup viscosity of a sample composition according to the Ford cup manufacturer's recommendations, followed by placing two hundred grams of the sample into a 341 g glass jar annealed tightly. The sample was then placed into a 54° C. oven for seven days. Upon removal from the oven, the sample was allowed to equilibrate to 25° C. and the #4 Ford cup viscosity was measured. The increase in viscosity after seven days was rated as very good, good or unacceptable; where little or no increase in viscosity is considered to be very good. Very good=0-15% increase in viscosity, good=15-40% increase in viscosity, unacceptable=more than 40% increase in viscosity.

EXAMPLES

The acrylic monomer mixtures R1-R5 were polymerized and the polyester-forming reactants R6 were co-condensed, each in solvent in a batch reactor, with stirring, at STP. The acrylic polymers R1-R5 were polymerized in a nitrogen atmosphere. The resulting polymer compositions, which are used in examples 1 to 10, are given in the following TABLE 1.

TABLE 1

| | Resin Type | Monomers | | Solvent | NVM | Eq. Wt. | Mn | OH # | Functionality | Tg (° C.) |
|---|---|---|---|---|---|---|---|---|---|---|
| R1 | Acrylic | 2-ethylhexyl acrylate | 12.45 | 70% Ethyl benzene | 67% | 1252 | 3260 | 45 | 2.6 | 55 |
| | | Methyl methacrylate | 45.77 | 30% Methyl ethyl | | | | | | |
| | | 2-hydroxyethyl methacrylate | 6.99 | ketone | | | | | | |
| R2 | Acrylic | Methyl methacrylate | 28.25 | Isobutyl | 50% | 875 | 3835 | 64 | 4.4 | 87 |
| | | n-butyl methacrylate | 3.98 | Acetate | | | | | | |
| | | 2-hydroxyethyl methacrylate | 7.43 | | | | | | | |
| | | Styrene | 8.89 | | | | | | | |
| R3 | Acrylic | 2-hydroxyethyl methacrylate | 20.85 | Xylene | 60% | 374 | 3800 | 150 | 10.16 | 13 |
| | | Methacrylic acid | 0.79 | | | | | | | |
| | | 2-ethylhexyl acrylate | 17.19 | | | | | | | |
| | | Styrene | 10.84 | | | | | | | |
| | | 2-ethylhexyl methacrylate | 6.79 | | | | | | | |
| R4 | Acrylic | Hydroxy polyester acrylate | 32.11 | Propylene | 70% | 600 | 4500 | 94 | 7.5 | −10 |
| | | 2-hydroxyethyl methacrylate | 3.03 | glycol | | | | | | |
| | | Methacrylic acid | 0.09 | methyl | | | | | | |
| | | n-butyl methacrylate | 14.18 | ether | | | | | | |
| | | 2-ethylhexyl methacrylate | 12.27 | acetate | | | | | | |
| | | Styrene | 5.10 | | | | | | | |
| R5 | Acrylic | n-butyl methacrylate | 25.61 | Propylene | 70% | 914 | 3400 | 61 | 3.7 | 2 |
| | | Isobutyl methacrylate | 10.13 | glycol | | | | | | |
| | | Styrene | 5.17 | methyl | | | | | | |

TABLE 1-continued

| Resin Type | Monomers | Solvent | NVM | Eq. Wt. | Mn | OH # | Functionality | Tg (° C.) |
|---|---|---|---|---|---|---|---|---|
| R6 Polyester | Hydroxy polyester acrylate<br>Methacrylic acid<br>Neopentyl glycol<br>Acrylic Acid<br>Trimethylolpropane | 26.35 ether<br>0.09 acetate<br>35.58 Ethyl<br>44.35 Benzene<br>13.63 | 90% | 256 | 777 | 220 | 3 | NA |

Notes:
1. Functionality is calculated by dividing Mn (number average molecular weight) by equivalent weight.
2. Equivalent weight is solid hydroxyl equivalents per solid mole of resin.

A description of the alkylether functional aminoplast resins A1-A3, as used in Examples 1 to 10, is given in the following TABLE 2.

TABLE 2

| | Commercial Code | Description | NVM | Degree of Polymerization |
|---|---|---|---|---|
| A1 | Resimene CE-7103 | 90% methlyated/10% butylated melamine | 100% | 1.1 |
| A2 | Resimene 745 | 100% methylated melamine | 100% | 1.3 |
| A3 | Cymel 300 | 100% methylated melamine | 100% | 1.1 |

As shown in Tables 3 and 4, in each of the Examples 1-10, the alkylether functional aminoplast resins from TABLE 2 and the polymers from Table 1 were admixed at STP in a mixing vessel with the catalyst, amines and additives given in Table 3 (for clearcoats) and in TABLE 5 (for Basecoats). The results of testing the clearcoats are shown in TABLE 4 and the results of testing the basecoats are shown in TABLE 6.

TABLE 4

| Example | Solvent Resistance | Package Stability |
|---|---|---|
| 1 | ○ | X |
| 2 | ○ | Δ |
| 3 | ○ | Δ |

Key: ○ = Very Good  Δ = Good  X = Unacceptable

As shown in TABLE 4, the composition of Example 1 is not adequately shelf stable. In contrast, the composition of Example 2 comprises an acrylic polymer having the preferred hydroxyl number and is shelf stable. The composition of Example 3 is the same as that of Example 2 except that HMMM is used as the alkylether functional aminoplast resins and gives an acceptable product.

TABLE 3

Clearcoat Example Formulations

| Example | Hydroxy-Functional Components | Aminoplast | Catalyst | Amine | Rheology | Durability | Flow | Solvent |
|---|---|---|---|---|---|---|---|---|
| 1 | R4 60 (42) | A1 5.4<br>A2 5.4 | 3.3 (1.3) | 0.3 | 5 (1.5) | 2.5 (2.0) | 0.15 | 17.95 |
| 2 | R5 60 (42) | A1 3.9<br>A2 3.9 | 3.3 (1.3) | 0.3 | 5 (1.5) | 2.5 (2.0) | 0.15 | 20.95 |
| 3 | R5 60 (42) | A3 5.2 | 3.3 (1.3) | 0.3 | 5 (1.5) | 2.5 (2.0) | 0.15 | 23.55 |

Notes:
1. The hydroxy-functional polymers are tabulated as made, and the aminoplast are tabulated as supplied. The solids value is in parentheses (aminoplasts are 100% solids).
2. The additive and solvent values are given as supplied, with solids values in parentheses (where applicable).
3. The rheology additive is a 30% non-volatile acrylic copolymer solution.
4. The durability additives are composed of an aminoether hindered amine light stabilizer and a triazine ultraviolet light absorber.
5. The flow additive is a polydimethylsiloxane-containing leveling additive SILWET™ L-7500 (GE Silicones, Wilton, CT).
6. The catalyst is a sulfonic acid catalyst p-toluene sulfonic acid.
7. The amine is a secondary amine di-n-propylamine.
8. The solvent blend is 11 parts isobutanol and the remainder is a 50/50 wt. % blend of n-butyl acetate and primary amyl acetate.

TABLE 5

Basecoat Example Formulations

| Example | Hydroxy-Functional Components | Aminoplast | Catalyst | Amine | Rheology | Pigment | Durability | Solvent |
|---|---|---|---|---|---|---|---|---|
| 4 | R1 35 (23.5) | A1 1.4<br>A2 1.4 | 1.3 (0.9) | 0.03 | 20 (6) | 8 (5.6) | 0.8 (0.63) | 32.07 |
| 5 | R3 35 (21) | A1 4.3<br>A2 4.3 | 1.3 (0.9) | 0.03 | 20 (6) | 8 (5.6) | 0.8 (0.63) | 26.27 |
| 6 | R6 33 (29.7) | A1 8.2<br>A2 8.2 | 2.3 (1.6) | 0.06 | 20 (6) | 8 (5.6) | 0.8 (0.63) | 19.44 |
| 7 | R1 25 (16.8)<br>R2 25 (12.5) | A1 2.1<br>A2 2.1 | 1.7 (1.2) | 0.04 | 20 (6) | 8 (5.6) | 0.8 (0.63) | 15.26 |
| 8 | R1 25 (16.8)<br>R2 25 (12.5) | A3 2.8 | 1.7 (1.2) | 0.04 | 20 (6) | 8 (5.6) | 0.8 (0.63) | 16.66 |
| 9 | R1 25 (16.8)<br>R2 25 (12.5) | A3 2.8 | 1.7 (1.2) | 0 | 20 (6) | 8 (5.6) | 0.8 (0.63) | 16.66 |
| 10 | R1 18 (9)<br>R2 18 (12)<br>R6 5 (4.5) | A1 2.8<br>A2 2.8 | 1.6 (1.1) | 0.04 | 20 (6) | 8 (5.6) | 0.8 (0.63) | 22.96 |

Notes:
1. The hydroxy-functional components and the aminoplast values are given as supplied, as well as the solids value, in parentheses (aminoplasts are 100% solids).
2. The additive and solvent values are given as supplied, with solids values in parentheses (where applicable).
3. The rheology additive is a 30% non-volatile acrylic copolymer solution.
4. The durability additives are composed of an aminoether hindered amine light stabilizer and a triazine ultra-violet light absorber.
5. The catalyst is a sulfonic acid catalyst dodecylbenzene sulfonic acid.
6. The amine is a secondary amine di-n-propylamine.
7. The solvent blend comprises 11 parts isobutanol and the remainder is a 50/50 wt. % blend of n-butyl acetate and primary amyl acetate.

TABLE 6

| Example | Solvent Resistance | Package Stability |
|---|---|---|
| 4 | ○ | ○ |
| 5 | ○ | X |
| 6 | Δ | Δ |
| 7 | ○ | ○ |
| 8 | ○ | ○ |
| 9 | ○ | X |
| 10 | Δ | ○ |

Key: ○ = Very Good  Δ = Good  X = Unacceptable

As shown in TABLE 6, Example 5 is the same as Example 4 except that an stable (acrylic polymer having a higher hydroxyl number is used in Example 5, thus giving a less stable composition. Various hydroxyl functional polymers may successfully be used in the compositions of the present invention. For example, Example 6 is an all-polyester formulation, Example 7 is a blend of two acrylic polymers, and Example 10 is a blend of acrylic and polyester. Example 8 shows the effectiveness of HMMM in the compositions of the present invention. Example 9 is the same as F8 except it lacks a volatile amine and therefore lacks shelf stability.

We claim:

1. An aqueous or solvent borne composition comprising one or more low-temperature curing alkylether functional aminoplast resins, one or more hydroxyl group containing resins or polymers, one or more unblocked acid catalysts, each having a pKa of 0.25 to 1.0, and one or more volatile amines having a relative evaporation rate (RER) of 50-500,
    wherein, RER equals (p)(M)/11.6, with p being the vapor pressure of the amine in mm Hg and M being the molecular weight of the amine, and wherein the mole ratio of the said one or more volatile amines to the said one or more unblocked acid catalysts is from about 0.02 to 0.09.

2. A composition as claimed in claim 1, wherein the said one or more low-temperature curing alkylether functional aminoplast resins comprises alkylether functional polyamino nuclei, wherein the said nuclei are chosen from melamine, acetoguanamine, adipoguanamine, and benzoguanamine.

3. A composition as claimed in claim 2, wherein the said one or more low-temperature curing alkylether functional aminoplast resins comprise one or more alkylether group containing melamines having from 4 to 6 alkylether groups per melamine ring and an average degree of polymerization of from 1.0 to 2.0.

4. A composition as claimed in claim 3, wherein the said average degree of polymerization is from 1.0 to 1.5.

5. A composition as claimed in claim 1, wherein the said one or more hydroxyl group containing resins or polymers are chosen from acrylic polymers having an hydroxyl number of from 20 to 140 mg KOH/g, polyesters having an hydroxyl number of from 100 to 300 mg KOH/g and mixtures thereof.

6. A composition as claimed in claim 5, wherein the said one or more hydroxyl group containing resins or polymers comprise acrylic polymers having a primary hydroxyl functionality, defined as number average molecular weight/primary hydroxyl equivalent weight, of from 2 to 10.

7. A composition as claimed in claim 1, wherein the said one or more unblocked acid catalysts comprise a sulfonic acid.

8. A composition as claimed in claim 1, wherein the said one or more volatile amines comprise a secondary amine.

9. A composition as claimed in claim 3, wherein the said one or more alkylether group containing melamines comprise mixtures of methoxymethyl and butoxymethyl groups, such that the weight ratio of methoxymethyl to butoxymethyl groups ranges from 80:20 to 95:5.

10. A method of making the composition as claimed in claim 1 comprising mixing the one or more alkylether functional aminoplast resins, the one or more hydroxyl group containing resins or polymers, the one or more unblocked acids and the one or more volatile amines to form a mixture, such that the said one or more acids and the said one or more amines are added into the said mixture separately from one another.

* * * * *